(12) United States Patent
Bimolaksono et al.

(10) Patent No.: US 12,282,957 B2
(45) Date of Patent: Apr. 22, 2025

(54) FUNDING CENTRAL BANK DIGITAL CURRENCY (CBDC) WALLET ACCOUNTS

(71) Applicant: American Express Travel Related Services Company, Inc., New York, NY (US)

(72) Inventors: Lucky A. Bimolaksono, Hurlstone Park (AU); Matthew S. Bodell, New York, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 36 days.

(21) Appl. No.: 18/084,662

(22) Filed: Dec. 20, 2022

(65) Prior Publication Data

US 2024/0202820 A1    Jun. 20, 2024

(51) Int. Cl.
| | |
|---|---|
| *G06Q 40/00* | (2023.01) |
| *G06Q 20/36* | (2012.01) |
| *G06Q 20/38* | (2012.01) |
| *G06Q 20/40* | (2012.01) |
| *G06Q 40/04* | (2012.01) |

(52) U.S. Cl.
CPC ............ *G06Q 40/04* (2013.01); *G06Q 20/36* (2013.01); *G06Q 20/381* (2013.01); *G06Q 20/3829* (2013.01); *G06Q 20/389* (2013.01); *G06Q 20/401* (2013.01)

(58) Field of Classification Search
CPC ...... G06Q 40/04; G06Q 20/36; G06Q 20/381; G06Q 20/3829; G06Q 20/389; G06Q 20/401
See application file for complete search history.

(56) References Cited

U.S. PATENT DOCUMENTS

| | | | | |
|---|---|---|---|---|
| 5,870,487 | A * | 2/1999 | Graves ................ | B65H 3/0638 |
| | | | | 382/318 |
| 11,182,776 | B1 * | 11/2021 | Bhos ..................... | G06Q 20/02 |
| 11,416,848 | B1 * | 8/2022 | Shetti ................. | G06Q 20/3672 |

(Continued)

FOREIGN PATENT DOCUMENTS

| | | | | |
|---|---|---|---|---|
| EP | | 1901247 A1 | 3/2008 | |
| WO | WO-2022020523 A1 * | 1/2022 | ............ G06Q 20/02 |

OTHER PUBLICATIONS

Carstens : "The future of money and payments*", The European Money and Finance Forum, SUERF Policy Note, Issue No. 66, Apr. 2019 (Year: 2019).*

(Continued)

*Primary Examiner* — Edward J Baird
(74) *Attorney, Agent, or Firm* — Thomas | Horstemeyer, LLP

(57) ABSTRACT

Disclosed are various embodiments for funding central bank digital currency (CBDC) accounts by converting funds (e.g., fiat money, representative money, account currency, etc.) into CBDC. A request to fund a central bank digital currency (CBDC) wallet associated with a CBDC wallet address is received. The associated funds can be verified and, in the case of fiat money, confirmed destroyed. A transaction can be generated indicating an addition of CBDC having a CBDC value corresponding to the value of the funds. The transaction can be recorded in a CBDC ledger in association with the CBDC wallet address.

20 Claims, 6 Drawing Sheets

(56) References Cited

U.S. PATENT DOCUMENTS

| | | | |
|---|---|---|---|
| 2013/0262295 A1* | 10/2013 | Narayanan | G06Q 20/065 |
| | | | 705/39 |
| 2016/0027042 A1* | 1/2016 | Heeter | G06Q 30/0248 |
| | | | 705/14.47 |
| 2018/0077313 A1* | 3/2018 | Eagleton | H04N 1/04 |
| 2020/0151682 A1* | 5/2020 | Hurry | H04L 9/3239 |
| 2021/0320917 A1 | 10/2021 | Rose | |
| 2022/0292496 A1* | 9/2022 | Yan | G06Q 20/1085 |
| 2023/0070586 A1* | 3/2023 | Kapur | G06Q 20/123 |
| 2023/0075202 A1* | 3/2023 | Mullins | G06Q 20/4037 |
| 2023/0344649 A1* | 10/2023 | Zamani | G06Q 20/3227 |

OTHER PUBLICATIONS

Geoffrey Goodell et al: "Digital Currency and Economic Crises: Helping States Respond", Arxiv.org, Cornell University Library, 201 Olin Library Cornell University Ithaca, NY 14853, Aug. 2, 2020 (Aug. 2, 2020), XP081732462.

European Seach Report in related EP Application No. 23216131, mailed Apr. 3, 2024.

\* cited by examiner

FUNDING CENTRAL BANK DIGITAL CURRENCY (CBDC) WALLET ACCOUNTS

BACKGROUND

A central bank digital currency (CBDC) is a digital currency that is issued by a government entity, such as a central bank, a reserve bank, or a state monetary authority. Accordingly, the government for each country can have a separate CBDC for their citizens to use in their markets. As a result, each government may develop a different implementation of their CBDC.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for funding central bank digital currency (CBDC) accounts by converting funds into CBDC. In various examples, the present disclosure relates to converting fiat money into a central bank digital currency (CBDC). Fiat money includes paper or coin currencies that are considered legal tender by a government entity. As the use of digital currency as a medium for the exchange goods and services gains in popularity, a user may be required or desire to make a transaction using CBDC. If the user only has fiat money and a bank is inaccessible (e.g., not in proximity to user location, user is unbanked, etc.), the user may need to convert the fiat money into the digital currency to allow the user to proceed with the transaction. According to various embodiments of the present disclosure, fiat money can be converted into CBDC with safeguards in place to verify the legitimacy of the fiat money and ensure the fiat money can no longer be used once converted into CBDC.

Figure 1:
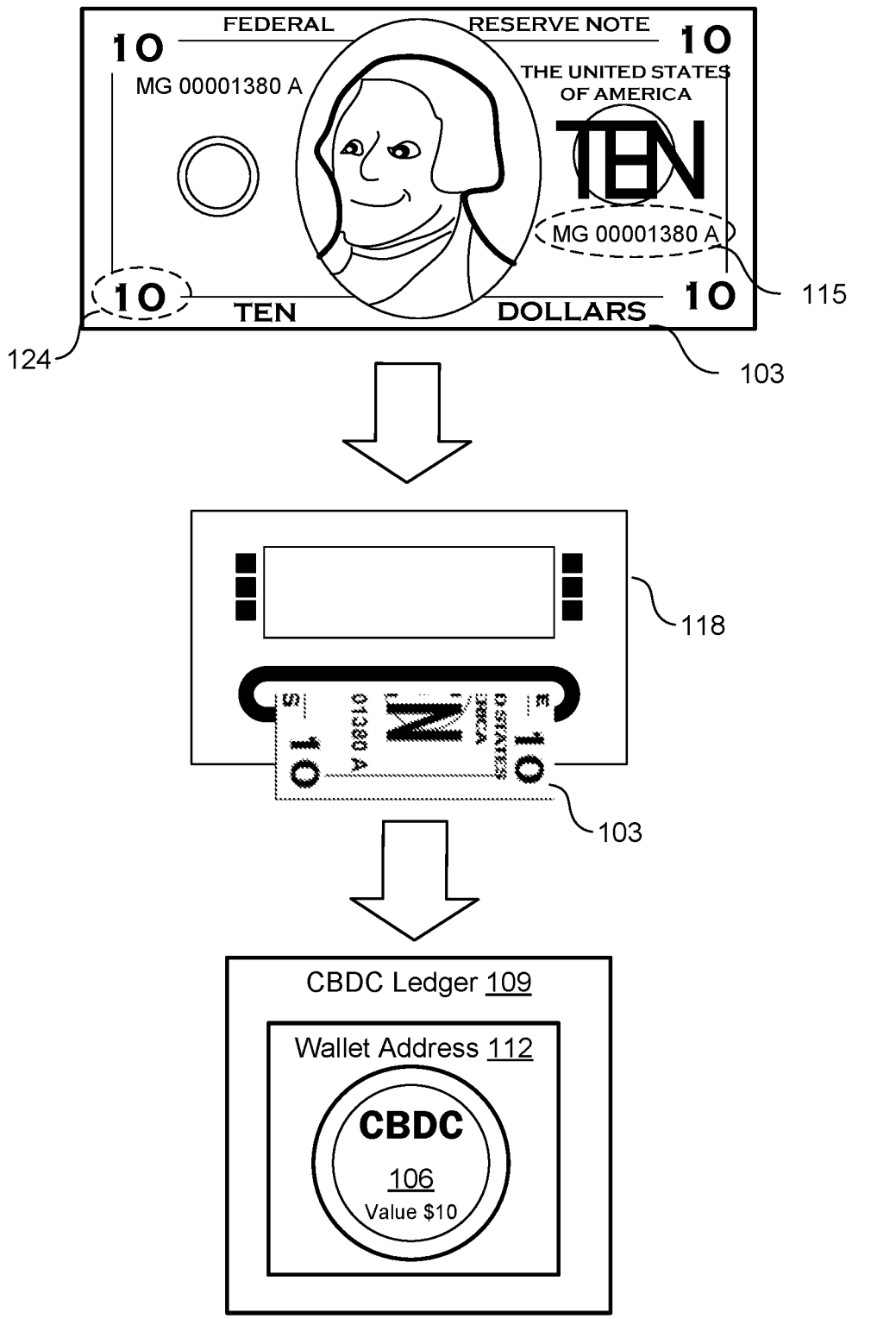
FIG. 1 is a drawing depicting one of several embodiments of the present disclosure.

Turning now to FIG. 1, shown is an example scenario 100 illustrating fiat money 103 being converted into CBDC 106 according to various embodiments of the present disclosure.

A CBDC 106 can refer to a digital currency issued by a central bank of a government. In some scenarios, a CBDC 106 can be implemented using a database managed by a central bank 107 (FIG. 2) of a government organization. The database can include a CBDC ledger 109 which, in various examples, can be represented by a distributed ledger or a blockchain. In various examples, the CBDC 106 can be stored in the CBDC ledger 109 in the form of a transaction that is written to a CBDC wallet address 112 of the CBDC ledger 109. The CBDC wallet address 112 can be used for receiving or sending CBDC 106 on the CBDC ledger 109.

In various examples, fiat money 103 can be converted into CBDC 106 by obtaining an image of the fiat money 103 and validating the authenticity of the fiat money 103. In various examples, the authenticity is validated based at least in part on the serial number 115 included on the fiat money 103 and extracted from the image of the fiat money 103. In some examples, as shown in FIG. 1, a user can input the fiat money 103 into a scanning system 118 which is configured to collect the fiat money 103 and scan an image of the fiat money 103. In other examples, a user or a verifying entity can use his or her mobile device or other type of client device 121 (FIG. 2) to scan an image of the fiat money 103.

The image of the fiat money 103 can be analyzed to verify the authenticity of the fiat money 103 prior to converting to CBDC 106. In various examples, the serial number 115, a money value 124, the identity of the central bank 107 of a government organization that issued the fiat money 103, and/or other information can be extracted from the image of the fiat money 103 and used to verify the authenticity of the fiat money 103.

For example, a currency registry 127 (FIG. 2) associated with the central bank 107 can include a list of serial numbers 115 corresponding to money issued by the central bank 107. In various examples, the extracted serial number 115 can be compared with the currency registry 127 to determine whether the extracted serial number 115 is included in the list of serial numbers 115 that correspond to money issued by the central bank 107. In some examples, the currency registry 127 can include a currency status 130 (FIG. 2) associated with the serial number 115. In various examples, the currency status 130 can indicate whether the serial number 115 corresponds to physical currency or digital currency. The currency status 130 can be updated to indicate the conversion of physical currency to digital currency. Although the discussion of verifying the authenticity of the fiat money 103 in this example is focused on the serial number 115 extracted from the image of the fiat money 103, it is understood that additional verification techniques can be performed using the image of the fiat money 103 to determine the authenticity of the fiat money 103.

Upon verifying the authenticity of the fiat money 103, the CBDC wallet address 112 to which the CBDC 106 will be associated with is determined. In various examples, the CBDC wallet address 112 can be provided by the user requesting to convert the fiat money 103 to CBDC 106. For example, a user requesting to convert fiat money 103 into CBDC 106 can have a registered CBDC wallet address 112 to a CBDC ledger 109 managed by a central bank 107. In various examples, the CBDC wallet address 112 can be representative of a CBDC account of the user. In various examples, the CBDC wallet address 112 is included with a request to convert the fiat money 103 to CBDC 106. In other examples, the user is requested to provide the CBDC wallet address 112.

In some examples, the central bank 107 associated with the CBDC wallet address 112 may differ from the central bank 107 that issued the fiat money 103. For example, the fiat money 103 can correspond to a first type of currency (e.g., United States dollar) and the central bank 107 associated with the CBDC wallet address 112 may issue physical and digital currency corresponding to a second type of currency (e.g., Euro). In other examples, the type of currency of the fiat money 103 and currency issued by the central bank 107 associated with the CBDC wallet address 112 is the same type of currency (e.g., both correspond to the United States dollar).

In situations where the type of currency of the fiat money 103 and the currency issued by the central bank 107 associated with the CBDC wallet address 112 are the same, the fiat money 103 must be confirmed to be destroyed before the CBDC 106 is made available for use to the user. In particular, to avoid situations where multiple forms of the same issued money are in circulation, thereby causing inflation, the fiat money 103 must be confirmed to be destroyed or no longer usable before it can be used as CBDC 106.

In various examples, the fiat money 103 can be destroyed by being shredded, defaced (e.g., with a stamp), burned, or other form of destruction. In various examples, a second image of the destroyed fiat money 103 can be obtained and analyzed to confirm destruction. In some examples, the scanning system 118 is configured to destroy or otherwise deface the fiat money 103. For example, the scanning system 118 can further include a shredder that shreds the inputted fiat money 103 upon receipt. In some examples, a trusted entity can be used to verify the destruction of the fiat money 103. For example, the fiat money 103 can be presented to a bank, post office, or other type of trusted entity that can verify the destruction of the fiat money 103.

In situations where the types of currencies between the fiat money 103 and the CBDC differ, the destruction of the fiat money 103 is not required. However, prior to being able to use the converted CBDC 106, the fiat money 103 will need to be confirmed as surrendered to a trusted entity to avoid situations where a person would maintain possession of the fiat money 103 and the converted CBDC 106. In various examples, the value of CBDC 106 to be added to the CBDC wallet address 112 will need to be calculated using the exchange rate between the two types of currencies. For example, assume that the fiat money 103 corresponds to a ten dollar United States bill (e.g., $10), the central bank 107 associated with the CBDC wallet address 112 issues euros, and the exchange rate is 1.04 dollars to 1 euro. In this example, the value of the CBDC 106 would be calculated to be 9.66 euros.

Upon verifying the authenticity of the fiat money 103 and determining the value of the CBDC 106, a transaction is generated to indicate the addition of CBDC 106 of the determined value to the CBDC account associated with a CBDC wallet address 112 in the CBDC ledger 109. In situations where the destruction of the fiat money 103 is required and not yet confirmed, the transaction can be generated to include a hold on the use of the CBDC 106 until destruction is confirmed.

In various examples, the transaction can be generated to include the destination address in the CBDC ledger 109 (e.g., CBDC wallet address 112), the value of the CBDC 106 being added, a cryptographic signature of a verifier performing the verification of the fiat money 103, a source address (e.g., verifier CBDC wallet address 133 (FIG. 2), and/or other information. In various examples, the transaction can be published or otherwise written to the CBDC ledger 109 to record the addition of the CBDC 106 to the CBDC ledger 109 in association with the provided CBDC wallet address 112. A signature of an authorized entity can be used to verify the legitimacy of the transaction which may be required prior writing the transaction to the CBDC ledger 109. In FIG. 1, the fiat money 103 (e.g., $10) is verified to be authenticated and destroyed before a transaction adding CBDC 106 having a value of $10 is written to the CBDC ledger 109 in association with the CBDC wallet address 112.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 2:
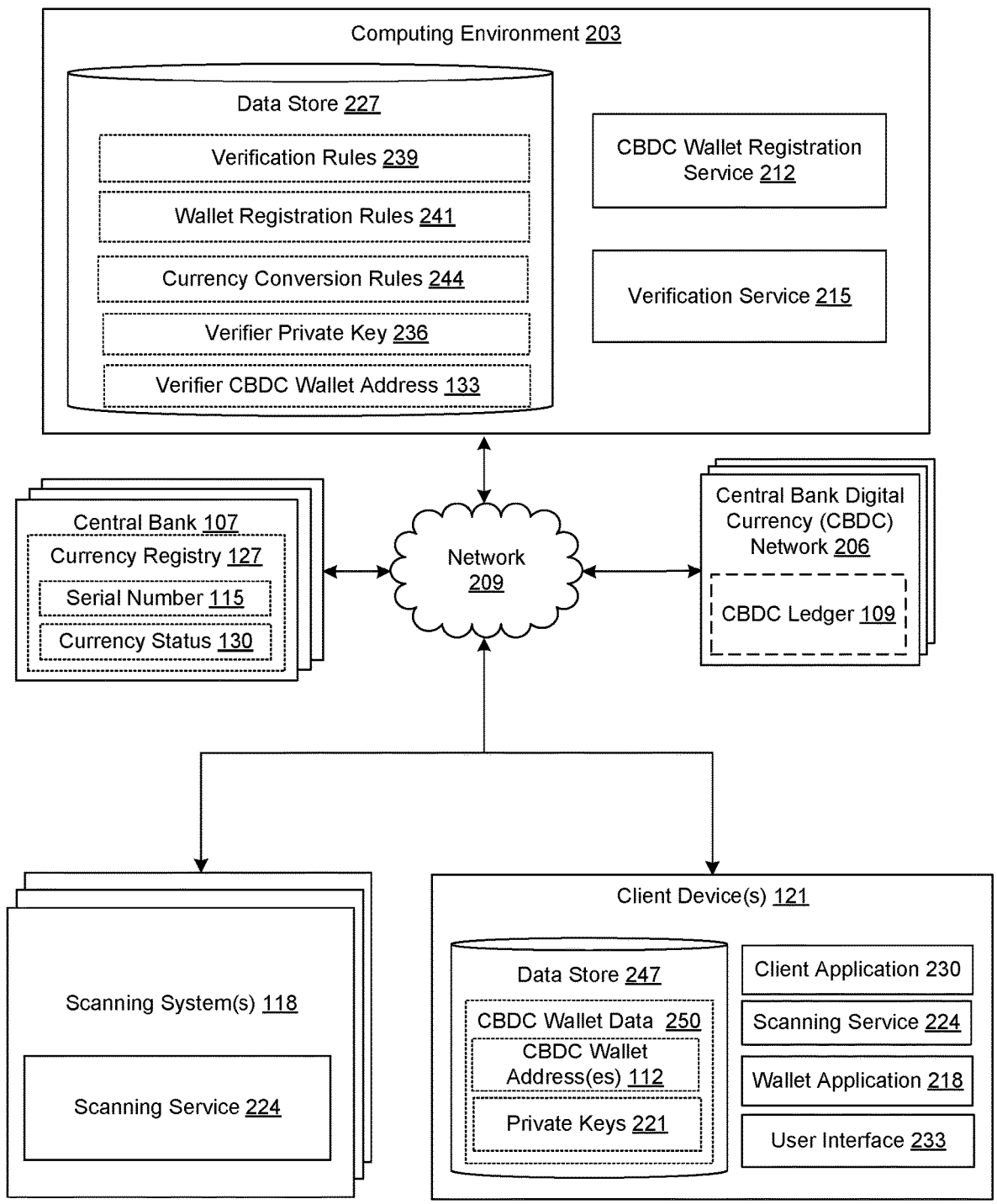
FIG. 2 is a drawing of a network environment according to various embodiments of the present disclosure.

With reference to FIG. 2, shown is a network environment 200 according to various embodiments. The network environment 200 can include a computing environment 203, one or more central banks 107, one or more central bank digital currency (CBDC) networks 206, a scanning system 118, and a client device 121, which can be in data communication with each other via a network 209.

The network 209 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 209 can also include a combination of two or more networks 209. Examples of networks 209 can include the Internet, intranets, extranets, virtual private networks (VPNs), and similar networks.

The central bank 107 corresponds to an entity that manages the currency that is backed by a government entity. For example, the central bank 107 of the United States is the United States Federal Reserve. In various examples, each country or government entity can have its own central bank 107 that issues currency and manages the policies associated with the issued currency. As such, there can be one or more central banks 107 that can be included in the networked environment 200. In various examples, a central bank 107 can maintain a currency registry 127 that includes a record of all issued currency and the status of the issued currency. For example, the currency registry 127 can include a list of serial numbers 115 associated with each form of currency (e.g., physical currency, digital currency) that is issued by the central bank 107. In some examples, the currency registry 127 can include a currency status 130 which can include a status associated with the particular issued currency. For example, the currency status 130 can indicate whether the issued currency is a physical currency or a digital currency. In some examples, the currency status 130 can include whether the issued currency was issued as a physical paper currency (e.g., fiat money 103), but was converted to CBDC 106, thereby making any physical paper currency having the associated serial number 115 invalid.

In various example, a central bank 107 can be associated with one or more CBDC network(s) 209. The CBDC network 206 can present an implementation of a central bank digital currency that is backed by one or more government entities. In some examples, the CBDC network 206 is implemented as a database that maintains the records of the transactions. In some examples, the database can include a CBDC ledger 109 that includes records of transactions indicating the addition or removal of CBDC 106 in association with a given CBDC wallet address 112.

In some examples, the CBDC ledger 109 can include a distributed ledger that represents a synchronized, eventually consistent, data store spread across multiple nodes, some or all of which can be in different geographic or network locations. Records of transactions involving the CBDC ledger 109 can be shared or replicated using a peer-to-peer network connecting the individual nodes that can write to the CBDC ledger 109. Once a transaction or record is recorded in the CBDC ledger 109, it can be replicated across the peer-to-peer network until the record is eventually recorded with all of the nodes. Various consensus methods can be used to ensure that data is written reliably to the CBDC ledger 109. Examples of a distributed ledger can include blockchains, distributed hash tables (DHTs), and similar data structures. In some scenarios, different territories or countries may have separate CBDC networks 209.

The computing environment 203 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 203 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource or any other distributed computing arrangement. In some cases, the computing environment 203 can correspond to an elastic computing resource where the allotted capacity of processing, network, storage, or other computing-related resources can vary over time.

Various applications or other functionality can be executed in the computing environment 203. The components executed on the computing environment 203 include a CBDC wallet registration service 212, a verification service 215, and other applications, services, processes, systems, engines, or functionality not discussed in detail herein.

The CBDC wallet registration service 212 can be executed to register generated CBDC wallet addresses 112 with a corresponding central bank 107 that manages the CBDC network 206 and CBDC ledger 109 associated with the CBDC wallet address 112. For example, a user interacting with a wallet application 218 on a client device 121 can send a request to the wallet application 218 to generate a CBDC wallet address 112 that is associated with a particular central bank 107. In response, the wallet application 218 can generate the CBDC wallet address 112, a corresponding private key 221, and a corresponding public key. The private key 221 can be stored on the client device 121 or on some other storage associated with the client device 121.

In response to generating the CBDC wallet address 112 for a given CBDC network 206, the wallet application 218 can send a request to the CBDC wallet registration service 212 to register the CBDC wallet address 112 with the central bank 107. In some examples, the CBDC wallet registration service 212 may authenticate the user associated with the CBDC wallet address 112. For example, the CBDC wallet registration service 212 may perform or request a trusted third-party entity to perform a know-your-customer (KYC) authentication or other type of authentication to authenticate the user associated with the CBDC wallet address 112. Upon authenticating the CBDC wallet address 112, the CBDC wallet registration service 212 can register the CBDC wallet address 112 with the CBDC network 206, thereby permitting the CBDC wallet address 112 to be used to send and receive CBDC 106 in association with the CBDC network 206.

The verification service 215 can be executed to verify funds (e.g., fiat money 103, representative money, account currency, etc.) that can be converted to CBDC 106 associated with a given CBDC wallet address 112. In some examples, the verification service 215 can interact with the scanning service 224 executed by a scanning system 118, a client device 121, or other type of computing device and/or a wallet application 218 to obtain a request to convert the funds to CBDC 106. In some examples, the scanning service 224 can send a request to the verification service 215 that includes an image of fiat money 103 and a CBDC wallet address 112.

In various examples, the verification services 215 authenticates the fiat money 103 associated with the image based at least in part on an analysis of one or more features extracted from the image. For example, the verification service 215 can extract a serial number 115, a money value 124, the identity of the central bank 107 of a government organization that issued the fiat money 103, and/or other information from the image of the fiat money 103. In some examples, the verification service 215 determines whether the extracted serial number 115 is included in the list of serial numbers 115 of the currency registry 127 of the central bank 107 that issued the fiat money 103. For example, the verification service 215 can have access to the currency registry 127 by maintaining a copy of the currency registry 127 in the data store 227. In other examples, the verification service 215 can send a request to the central bank 107 including the extracted serial number 115. In response to the receiving the request, the central bank 107 can notify the verification service 215 if the serial number 115 is included in the currency registry and if so, the currency status 130.

In other examples, the verification service 215 can analyze additional features of the image of the fiat money 103 to determine whether the fiat money 103 is valid. For example, the verification service 215 may analyze the image to identify one or more markers embedded in the image that are indicators of valid physical currency. In some examples, the verification service 215 can generate a score based at least in part on the presence of one or more markers included in the image and the result of the serial number 115 comparison. The score can be used to determine whether the verification service 215 determines that the requested fiat money 103 is to be considered valid.

In some examples, the verification service 215 can interact with a client application 230 on a client device 121 associated with a trusted third party user. In this example, the trusted third party user can perform a manual review of the fiat money 103 and indicate via user inputs whether the fiat money 103 is valid. For example, a user can present the fiat money 103 to a trusted third party user associated with a trusted third-party entity (e.g., bank, post office, etc.) and the user can interact with the verification service 215 via interactions with a user interface 233 rendered by the client application 230 to indicate features associated with the fiat money 103 and/or whether the user verifies the authenticity of the fiat money 103.

Upon verifying the authenticity of the fiat money 103, the verification service 215 can determine the CBDC wallet address 112. In various examples, the CBDC wallet address 112 can be provided by the user requesting to convert the fiat money 103 to CBDC 106. For example, a user requesting to convert fiat money 103 into CBDC 106 can have a registered CBDC wallet address 112 to a CBDC ledger 109 managed by a central bank 107. In various examples, the CBDC wallet address 112 is included with a request received by the verification service 215 to convert the fiat money 103 to CBDC 106. In other examples, the verification service 215 sends a request requesting the CBDC wallet address 112 to the user via the scanning service 224 of the scanning system 118, the scanning service 224 of the client device, the client application 230 of the client device 121 and/or other application.

The verification service 215 can further be executed to confirm destruction of the fiat money 103 when the type of currency of the fiat money 103 and the CBDC issued by the central bank 107 associated with the CBDC wallet address 112 are the same. In some examples, the verification service 215 requests a second image of the fiat money 103 where the obtained second image can be analyzed by the verification service 215 to determine that the fiat money 103 is destroyed. In various examples, the fiat money 103 can be destroyed by being shredded, defaced (e.g., with a stamp), burned, or other form of destruction. In some examples, the verification service 215 can verify destruction based at least in part on a user inputs provided by a trusted entity verifying the destruction of the fiat money 103. For example, the fiat money 103 can be presented to a bank, post office, or other type of trusted entity that can verify the destruction of the fiat money 103.

In situations where the types of currencies between the fiat money 103 and the CBDC differ, the verification service 215 can be executed to calculate the value of CBDC 106 to be added using the exchange rate between the two types of currencies. For example, assume that the fiat money 103 corresponds to a ten dollar United States bill (e.g., $10), the central bank 107 associated with the CBDC wallet address 112 issues euros, and the exchange rate is 1.04 dollars to 1 euro. In this example, the verification service 215 can calculate the value of the CBDC 106 to be 9.66 euros. In addition, the verification service 215 will need to confirm that the fiat money 103 has been surrendered to a trusted entity to avoid situations where a person would maintain possession of the fiat money 103 and the converted CBDC 106

The verification service 215 can further be executed to generate a transaction indicating the addition of CBDC 106 of the determined value to the CBDC wallet associated with a CBDC wallet address 112 in the CBDC ledger 109. In situations where the destruction or surrender of the fiat money 103 is required and not yet confirmed, the transaction can be generated to include a hold on the use of the CBDC 106 until destruction of the fiat money 103 having the same currency or surrender of the fiat money 103 having a differing currency is confirmed.

In various examples, the verification service 215 generates the transaction to include the destination address in the CBDC ledger 109 (e.g., CBDC wallet address 112), the value of the CBDC 106 being added, a cryptographic signature of a verifier performing the verification of the fiat money 103, a source address (e.g., verifier CBDC wallet address 133 (FIG. 2), and/or other information. In various examples, the verification service 215 signs the transaction using a verifier private key 236. The signature of the transaction using the verifier private key 236 can indicate that the transaction has been verified and is permitted by the central bank 107.

In various examples, the verification service 215 can publish the transaction to the CBDC ledger 109 to record the addition of the CBDC 106 to the CBDC ledger 109 in association with the provided CBDC wallet address 112. Once a transaction or record is recorded in the CBDC ledger 109, it can be replicated across the peer-to-peer network until the record is eventually recorded with all of the nodes. Various consensus methods can be used to ensure that data is written reliably to the CBDC ledger 109.

Also, various data is stored in a data store 227 that is accessible to the computing environment 203. The data store 227 can be representative of a plurality of data stores 227, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 227 is associated with the operation of the various applications or functional entities described below. This data can include verification rules 239, wallet registration rules 241, currency conversion rules 244, verifier private key 236, verifier CBDC wallet address 133, and potentially other data.

The verification rules 239 include rules, models, and/or configuration data for the various algorithms or approaches employed by the verification service 215 in determining whether funds (e.g., fiat money 103, representative money, account currency, etc.) are valid for conversion to CBDC 106. In various examples, verification rules 239 can include features that should be present in images of fiat money 103 for verification. In various examples, the verification rules 239 can include weights that can be assigned to the various identified features to generate a score for authenticity. In some examples, the verification rules 239 include one or more application programming interface (API) calls that can be called to poll the currency registry 127 of a given central bank 107. In some examples, the verification rules 239 include rules defining how fiat money 103 should be destroyed to confirm that the fiat money 103 can no longer be used in circulation.

The wallet registration rules 241 include rules, models, and/or configuration data for the various algorithms or approaches employed by the CBDC wallet registration service 212. For example, the wallet registration rules 241 can include rules defining the authentication of the user requesting to register his or her CBDC wallet address 112. In some examples, the wallet registration rules 241 provide rules or policies associated with the central bank 107 that must be met to permit a user to receive or use CBDC 106 in association with the registered wallet address 112.

The currency conversion rules 244 include rules, models, and/or configuration data for the various algorithms or approaches employed by the verification service 215 to determine the CBDC value when the type of currency associated with a fund differs from the type of currency associated with the CBDC network 206 corresponding to the CBDC wallet address 112. For example, the currency conversion rules 244 can include the exchange rates for the different currencies. In some examples, the currency conversion rules 244 can be updated periodically as the exchange rates can fluctuate overtime.

The verifier private key 236 corresponds a private key of a cryptographic key-pair stored in the computing environment 203 associated with the verifier of the funds to be converted to CBDC 106. The verifier private key 236 can be generated in association with the verifier CBDC wallet address 133 and can be used by the verification service 215 to sign a transaction indicating the addition of CBDC 106 to a CBDC wallet address 112 associated with the requesting user. For example, upon authentication of the funds and verifying the destruction of the funds, when applicable, the verification service 215 can use the verifier private key 236 to sign the transaction, thereby indicating that the addition of the CBDC is authorized.

Although the computing environment 203 is illustrated as being separate from the central bank 107, it should be noted that some or all of the functionality within the computing environment 203, including the CBDC wallet registration service 212 and the verification service 215 can be implemented as part of the central bank 107. In other examples, some or all of the functionality with the computing environment 203 can be implemented by one or more trusted third party entities that can act on behalf of the central bank 107.

The client device 121 is representative of a plurality of client devices that can be coupled to the network 209. The client device 121 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 121 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 121 or can be connected to the client device 121 through a wired or wireless connection.

The client device 121 can be configured to execute various applications such as a client application 230, a scanning service 224, a wallet application 218, or other applications. The client application 230 can be executed in a client device 121 to access network content served up by the computing environment 203 or other servers, thereby rendering a user interface 233 on the display. To this end, the client application 230 can include a browser, a dedicated application, or other executable, and the user interface 233 can include a network page, an application screen, or other user mechanism for obtaining user input. The client device 121 can be configured to execute applications beyond the client application 230 such as email applications, social networking applications, word processors, spreadsheets, or other applications.

The scanning service 224 can be generated to scan an image of fiat money 103, generate a request to convert the fiat money 103 to CBDC 106, and transmit the request including the image of the fiat money 103 to the verification service 215 for verification. In various examples, the scanning service 224 can access the CBDC wallet address 112 associated with the CBDC request and provide the CBDC wallet address 112 to the verification service 215.

The wallet application 218 can be executed to allow the client device 121 to interact with the nodes of the CBDC network 206. The wallet application 218 can be executed to send CBDC from the user CBDC wallet address 112 to a specified CBDC wallet address 112, to view the amount of CBDC 106 that the CBDC network 209 has recorded as being associated with the CBDC wallet address 112, or to sign transactions associated with the CBDC wallet address 136 using the private key 221. In various examples, the wallet application 218 can generate CBDC wallet addresses 112 and corresponding private keys 221 in response to a request to generate a CBDC wallet address for a given CBDC network 206. In response to generating the CBDC wallet address, the wallet application 218 can interact with the CBDC wallet registration service 212 to register the generated CBDC wallet address with the given CBDC network 206. In various examples, the wallet application 218 can generate and provide access to multiple CBDC wallet addresses 112 associated with multiple CBDC networks 206. For example, a user may have a CBDC wallet address 112 for Country A and another CBDC wallet address 112 for Country B.

The client data store 247 represents mass storage or memory in which the client device 121 can store information. The client data store 247 can include CBDC wallet data 250, and other data. The CBDC wallet data 250 includes one or more CBDC wallet address(es) 112 and the corresponding private keys 221. A client device 121 may store multiple CBDC wallet addresses 112 associated with multiple CBDC networks 206 associated with central banks 107 of differing jurisdictions. The corresponding private key 221 can be used to sign transactions initiated by the owner of a given CBDC wallet address 112 to transfer CBDC 106 from the given CBDC wallet address 112 to another CBDC wallet address of another entity.

The scanning system 118 can be a system configured to intake fiat money 103 and initiate a request to convert the fiat money 103 to CBDC 106. The client device 121 can include a processor-based system such as a computer system. In some examples, the scanning system 118 can be compared to a reverse automatic teller machine (ATM) that intakes fiat money 103 to scan and, in some cases, destroy the fiat money 103 to allow the fiat money 103 to be converted to CBDC 106. In various examples, the scanning system 118 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the scanning system 118 or can be connected to the scanning system through a wired or wireless connection.

The scanning system 118 can be configured to execute various applications such as a scanning service 224 or other applications. The scanning service 224 can be generated to scan an image of fiat money 103, generate a request to convert the fiat money 103 to CBDC 106, and transmit the request including the image of the fiat money 103 to the verification service 215 for verification. In various examples, the scanning service 224 can access the CBDC wallet address 112 associated with the CBDC request and provide the CBDC wallet address 112 to the verification service 215. For example, the scanning service 224 can render a request on a display of the scanning system 118 asking a user to provide a quick response (QR) code, or other type of image that incorporates the CBDC wallet address 112. The scanning service 224 can obtain the CBDC wallet address 112 via communications with the client device 121 comprising the CBDC wallet address 112. In various examples, the request to convert the fiat money 103 to CBDC 106 includes one or more images of the fiat money 103, the CBDC wallet address 112, and/or other information.

In some examples, the scanning service 224 can interact with controls of the scanning system 118 to cause the destruction of the fiat money 103. For example, the scanning system 118 can include a shredder mechanism that can shred the fiat money 103. In other examples, the scanning system 118 can include a defacing mechanism (e.g., a stamp) which can be used to deface the fiat money 103 such that the physical fiat money 103 become invalid or otherwise unusable in circulation.

Figure 3:
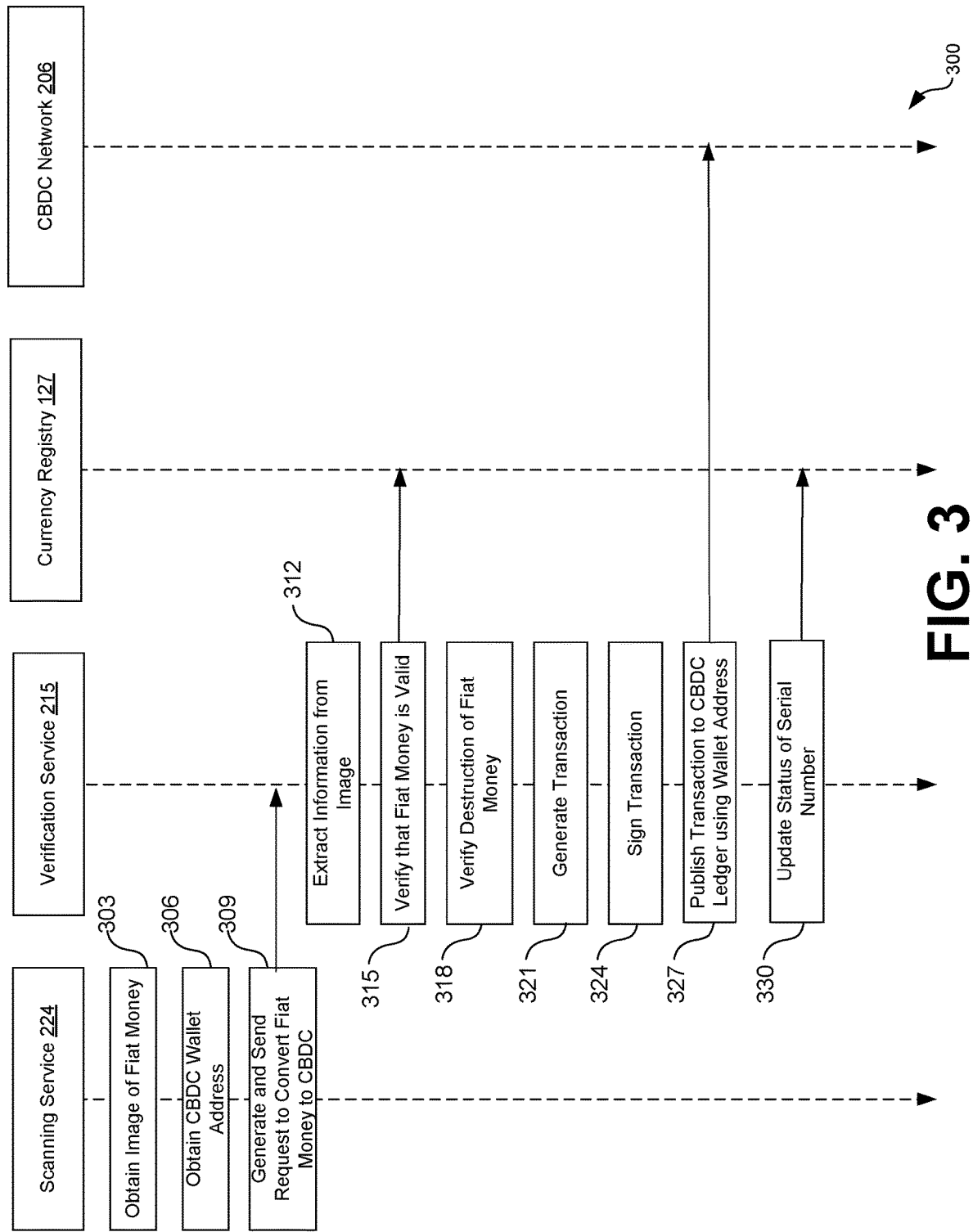
FIG. 3 is a sequence diagram illustrating an example the interactions between the various components of the network environment of FIG. 2 according to various embodiments of the present disclosure.

FIG. 3 is a sequence diagram 300 depicting the interactions between the various components of the network environment 200 according to various embodiments of the present disclosure. The sequence diagram of FIG. 3 is intended to illustrate how the verification service 215 interacts with the other components of the network environment 200 in order to convert fiat money 103 (FIG. 1) into CBDC 106 (FIG. 1). As an alternative, the sequence diagram 300 of FIG. 3 can be viewed as depicting an example of elements of a method implemented within the network environment 200.

Beginning with block 303, the scanning service 224 obtains an image of fiat money 103. In some examples, the scanning service 224 is incorporated into a scanning system 118 which can collect the fiat money 103 and via the scanning service 224 scan an image of the fiat money 103. For example, the scanning system 118 can include a scanner or other type of image capture device that upon instruction from the scanning service 224 can capture an image of the received fiat money 103. In other examples, the scanning service 224 can be executed by a client device 121 having or being in data communication with an image capture device. The scanning service 224 can cause the image capture device to obtain an image of the fiat money 103.

At block 306, the scanning service 224 obtains a CBDC wallet address 112 associated with the user. The CBDC wallet address 112 corresponds to the destination of the CBDC 106 converted from the fiat money 103. In some examples, the scanning service 224 can render a request on a display of the scanning system 118 asking a user to provide a quick response (QR) code, or other type of image that incorporates the CBDC wallet address 112. In other examples, the scanning service 224 can obtain the CBDC wallet address 112 via communications with the client device 121 comprising the CBDC wallet address 112. In examples where the scanning service 224 is executed on the client device 121, the scanning service 224 can obtain the CBDC wallet address from the data store 247 of the client device 121. In other examples, the scanning service 224 can interact with the wallet application 218 on the client device 121 which can provide the CBDC wallet address 112 to the scanning service 224.

At block 309, the scanning service 224 generates and sends a request to convert fiat money 103 to CBDC 106 to the verification service 215. In various examples, the request to convert the fiat money 103 to CBDC 106 includes one or more images of the fiat money 103, the CBDC wallet address 112, and/or other information.

At block 312, the verification service 215 analyzes the image of the fiat money 103 and extracts information from the image of the fiat money 103 that can be used for verification. For example, the verification service 215 can extract a serial number 115, a money value 124, the identity of the central bank 107 of a government organization that issued the fiat money 103, and/or other information from the image of the fiat money 103.

At block 315, the verification service 215 verifies that the fiat money 103 is valid. In some examples, the verification service 215 extracts the serial number 115 and determines whether the extracted serial number 115 is included in the list of serial numbers 115 of the currency registry 127 of the central bank 107 that issued the fiat money 103. For example, the verification service 215 can have access to the currency registry 127 by maintaining a copy of the currency registry 127 in the data store 227. In other examples, the verification service 215 can send a request to the central bank 107 including the extracted serial number 115. In response to the receiving the request, the central bank 107 can notify the verification service 215 if the serial number 115 is included in the currency registry and if so, the currency status 130.

In other examples, the verification service 215 can analyze additional features of the image of the fiat money 103 to determine whether the fiat money 103 is valid. For example, the verification service 215 can analyze the image to identify one or more markers embedded in the image that are indicators of valid physical currency. In some examples, the verification service 215 can generate a score based at least in part on the presence of one or more markers included in the image and the result of the serial number 115 comparison. The score can be used to determine whether the verification service 215 determines that the requested fiat money 103 is to be considered valid.

At block 318, the verification service 215 verifies destruction of the fiat money 103. In various examples, the fiat money 103 can be destroyed by being shredded, defaced (e.g., with a stamp), burned, or other form of destruction. In some examples, the scanning service 224 can provide an indication that the fiat money 103 is destroyed. For example, the scanning system 118 can comprise a destruction mechanism (e.g., stamp, defacer, shredder, incinerator, etc.) that receives the fiat money 103 after the image of the fiat money 103 is captured. The scanning service 224 can provide notice to the verification service 215 after the fiat money 103 has been destroyed. In some examples, the verification service 215 requests a second image of the fiat money 103 from the scanning service 224 where the obtained second image can be analyzed by the verification service 215 to determine that the fiat money 103 is destroyed. In some examples, the verification service 215 can verify destruction based at least in part on a user inputs provided by a trusted entity verifying the destruction of the fiat money 103. For example, the fiat money 103 can be presented to a bank, post office, or other type of trusted entity that can verify the destruction of the fiat money 103.

At block 321, the verification service 215 generates a transaction indicating the creation of the CBDC 106 based on the fiat money 103. For example, the verification service 215 generates the transaction to include the destination address in the CBDC ledger 109 (e.g., CBDC wallet address 112), the value of the CBDC 106 being added, a signature of a verifier entity associated with the verification service 215 performing the verification of the fiat money 103, a source address (e.g., verifier CBDC wallet address 133 (FIG. 2)), and/or other information.

At block 324, the verification service 215 signs the transaction using a verifier private key 236. For example, the verification service 215 can be associated with a trusted entity to the central bank 107 and verification by the trusted entity can be performed on behalf of the central bank 107 by the verification service 215. As such, the signature of the transaction using the verifier private key 236 can indicate that the transaction has been verified and is permitted by the central bank 107.

At block 327, the verification service 215 publishes or otherwise writes the transaction to the CBDC ledger 109 in the CBDC network 206 using the CBDC wallet address 112 included in the request. In various examples, once a transaction or record is recorded in the CBDC ledger 109, it can be replicated across the peer-to-peer network until the record is eventually recorded with all of the nodes. Various consensus methods can be used to ensure that data is written reliably to the CBDC ledger 109 of the CBDC network 206.

At block 330, the verification service 215 updates the currency status 130 of the serial number 115 in the currency registry 127. For example, the currency status 130 can be updated to indicate the conversion of physical currency to digital currency with respect to the given serial number 115. Thereafter, this portion of the process proceeds to completion.

Figure 4:
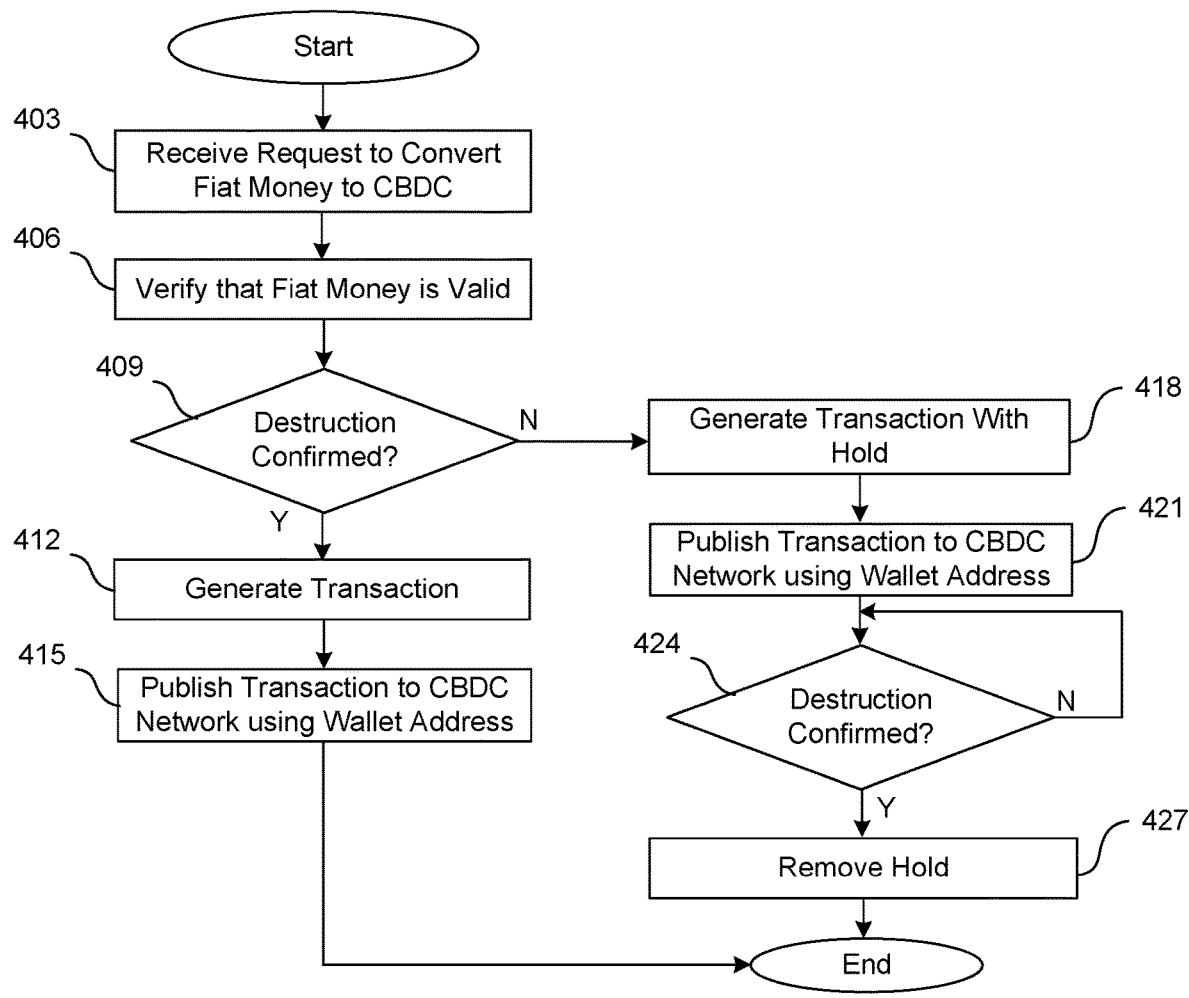
FIG. 4 is a flowchart illustrating one example of functionality implemented as portions of an application executed in a computing environment in the network environment of FIG. 2 according to various embodiments of the present disclosure.

Referring next to FIG. 4, shown is a flowchart that provides one example of the operation of a portion of the verification service 215. The flowchart of FIG. 4 provides merely an example of the many different types of functional arrangements that can be employed to implement the operation of the depicted portion of the verification service 215. As an alternative, the flowchart of FIG. 4 can be viewed as depicting an example of elements of a method implemented within the network environment 200.

It should be noted that the discussion of FIG. 4 corresponds to situations where the fiat money 103 is of the same type of currency as the CBDC 106. In situations where the fiat money 103 is of a differing type of currency as the CBDC 106, the value of the CBDC 106 will need to be calculated using an exchange rate between the differing currencies. In addition, while the fiat money 103 of a differing currency does not need to be destroyed, it will need to be surrendered to a trusted entity.

Beginning with block 403, the verification service 215 receives a request to convert fiat money 103 to CBDC 106. The request can be received by a scanning system 118, a client device 121, and/or other system or device in communication with the verification service 215. In various examples, the request to convert the fiat money 103 to CBDC 106 includes one or more images of the fiat money 103, the CBDC wallet address 112, and/or other information.

At block 406, the verification service 215 verifies that the fiat money 103 is valid. In some examples, the verification service 215 extracts the serial number 115 and determines whether the extracted serial number 115 is included in the list of serial numbers 115 of the currency registry 127 of the central bank 107 that issued the fiat money 103. For example, the verification service 215 can have access to the currency registry 127 by maintaining a copy of the currency registry 127 in the data store 227. In other examples, the verification service 215 can send a request to the central bank 107 including the extracted serial number 115. In response to the receiving the request, the central bank 107 can notify the verification service 215 if the serial number 115 is included in the currency registry and if so, the currency status 130.

In other examples, the verification service 215 can analyze additional features of the image of the fiat money 103 to determine whether the fiat money 103 is valid. For example, the verification service 215 can analyze the image to identify one or more markers embedded in the image that are indicators of valid physical currency. In some examples, the verification service 215 can generate a score based at least in part on the presence of one or more markers included in the image and the result of the serial number 115 comparison. The score can be used to determine whether the verification service 215 determines that the requested fiat money 103 is to be considered valid.

At block 409, the verification service 215 determines whether the fiat money 103 has been destroyed. In various examples, the fiat money 103 can be destroyed by being shredded, defaced (e.g., with a stamp), burned, or other form of destruction. In some examples, the scanning service 224 can provide an indication that the fiat money 103 is destroyed. For example, the scanning system 118 can comprise a destruction mechanism (e.g., stamp, defacer, shredder, incinerator, etc.) that receives the fiat money 103 after the image of the fiat money 103 is captured. The scanning service 224 can provide notice to the verification service 215 after the fiat money 103 has been destroyed. In some examples, the verification service 215 requests a second image of the fiat money 103 from the scanning service 224 where the obtained second image can be analyzed by the verification service 215 to determine that the fiat money 103 is destroyed. In some examples, the verification service 215 can verify destruction based at least in part on a user inputs provided by a trusted entity verifying the destruction of the fiat money 103. For example, the fiat money 103 can be presented to a bank, post office, or other type of trusted entity that can verify the destruction of the fiat money 103. If the fiat money 103 is confirmed as being destroyed, the verification service 215 proceeds to block 412. Otherwise, the verification service proceeds to block 418.

At block 412, the verification service 215 generates a transaction indicating the creation of the CBDC 106 based on the fiat money 103. For example, the verification service 215 generates the transaction to include the destination address in the CBDC ledger 109 (e.g., CBDC wallet address 112), the value of the CBDC 106 being added, a signature of a verifier entity associated with the verification service 215 performing the verification of the fiat money 103, a source address (e.g., verifier CBDC wallet address 133 (FIG. 2)), and/or other information. In various examples, the verification service 215 signs the transaction using a verifier private key 236. The signature of the transaction using the verifier private key 236 can indicate that the transaction has been verified and is permitted by the central bank 107.

At block 415, the verification service 215 publishes or otherwise writes the transaction to the CBDC ledger 109 in the CBDC network 206 using the CBDC wallet address 112 included in the request. In various examples, once a transaction or record is recorded in the CBDC ledger 109, it can be replicated across the peer-to-peer network until the record is eventually recorded with all of the nodes. Thereafter, this portion of the process proceeds to completion.

At block 418, when confirmation of the destruction of the fiat money 103 is not confirmed, the verification service 215 generates a transaction indicating the creation of the CBDC 106 based on the fiat money 103. For example, the verification service 215 generates the transaction to include the destination address in the CBDC ledger 109 (e.g., CBDC wallet address 112), the value of the CBDC 106 being added, a signature of a verifier entity associated with the verification service 215 performing the verification of the fiat money 103, a source address (e.g., verifier CBDC wallet address 133 (FIG. 2), and/or other information. However, since confirmation of the fiat money 103 being destroyed has not been confirmed, the transaction can be generated to indicate a hold on the CBDC 106 which will prevent a user from being able to use the CBDC 106.

At block 421, the verification service 215 publishes or otherwise writes the transaction with the hold to the CBDC ledger 109 in the CBDC network 206 using the CBDC wallet address 112 included in the request. In various examples, once a transaction or record is recorded in the CBDC ledger 109, it can be replicated across the peer-to-peer network until the record is eventually recorded with all of the nodes.

At block 424, the verification service 215 determines whether the fiat money 103 has been destroyed. In various examples, the fiat money 103 can be destroyed by being shredded, defaced (e.g., with a stamp), burned, or other form of destruction. In some examples, the scanning service 224 can provide an indication that the fiat money 103 is destroyed. For example, the scanning system 118 can include a destruction mechanism (e.g., stamp, defacer, shredder, incinerator, etc.) that receives the fiat money 103 after the image of the fiat money 103 is captured. The scanning service 224 can provide notice to the verification service 215 after the fiat money 103 has been destroyed. In some examples, the verification service 215 requests a second image of the fiat money 103 from the scanning service 224 where the obtained second image can be analyzed by the verification service 215 to determine that the fiat money 103 is destroyed. In some examples, the verification service 215 can verify destruction based at least in part on a user inputs provided by a trusted entity verifying the destruction of the fiat money 103. For example, the fiat money 103 can be presented to a bank, post office, or other type of trusted entity that can verify the destruction of the fiat money 103. If the fiat money 103 is confirmed as being destroyed, the verification service 215 proceeds to block 427. Otherwise, the verification service returns to block 424.

At block 427, the verification service 215 can cause the hold to be removed from the transaction that is recorded on the CBDC ledger 109 in the CBDC network 206. In various examples, the verification service 215 can invoke a smart contract to update the transaction that is recorded on the CBDC ledger 109 to remove the hold included in the transaction that is recorded on the CBDC ledger 109. Removal of the hold will indicate that the CBDC 106 represented by the transaction can be used in subsequent transactions. Thereafter, this portion of the process proceeds to completion.

Figure 5:
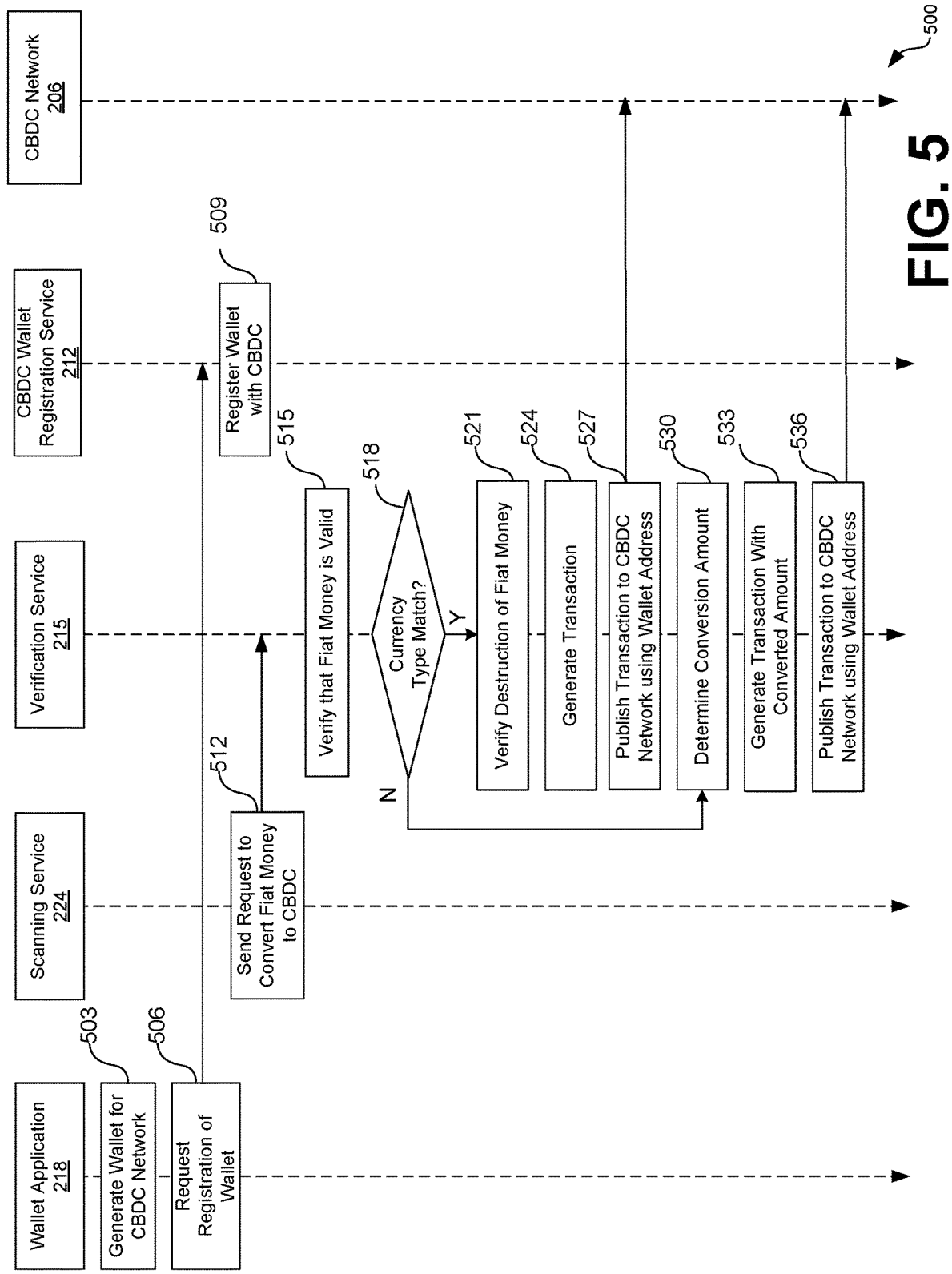
FIG. 5 is a sequence diagram illustrating an example the interactions between the various components of the network environment of FIG. 2 according to various embodiments of the present disclosure.

Moving on to FIG. 5, shown is a sequence diagram 500 depicting the interactions between the various components of the network environment 200 according to various embodiments of the present disclosure. The sequence diagram of FIG. 5 is intended to illustrate how the verification service 215 interacts with the other components of the network environment 200 in order to convert fiat money 103 to a CBDC 106 when the fiat money 103 is a different type of currency than the CBDC 106. As an alternative, the sequence diagram 500 of FIG. 5 can be viewed as depicting an example of elements of a method implemented within the network environment 200.

Beginning with block 503, the wallet application 218 can generate a CBDC wallet account for a particular CBDC network 206. In various examples, the wallet application 218 can generate and provide access to multiple CBDC wallet addresses 112 associated with multiple CBDC networks 206. For example, a user may have a CBDC wallet address 112 for a CBDC network 206 associated with Country A and another CBDC wallet address 112 for a CBDC network 206 associated with Country B. In various examples, the wallet application 218 can generate CBDC wallet addresses 112 and corresponding private keys 221 in response to a request to generate a CBDC wallet address for a given CBDC network 206.

At block 506, the wallet application 218 requests to register the generated CBDC wallet address 112. For example, the wallet application 218 can send a request to the CBDC wallet registration service 212 associated with the central bank 107 to register the CBDC wallet address 112 with the CBDC network 206 so that CBDC 106 associated with the CBDC wallet address 112 can be used subsequent transactions.

At block 509, the CBDC wallet registration service 212 registers the generated CBDC wallet address 112 with the central bank 107 that manages the CBDC network 206 and CBDC ledger 109 associated with the CBDC wallet address 112. For example, the CBDC wallet registration service 212 may perform or request a trusted third-party entity to perform a know-your-customer (KYC) authentication or other type of authentication to authenticate the user associated with the CBDC wallet address 112. Upon authenticating the CBDC wallet address 112, the CBDC wallet registration service 212 can register the CBDC wallet address 112 with the CBDC network 206, thereby permitting the CBDC wallet address 112 to be used to send and receive CBDC 106 in association with the CBDC network 206.

At block 512, the scanning service 224 sends a request to the verification service to convert fiat money 103 to CBDC 106. In various examples, the request to convert the fiat money 103 to CBDC 106 includes one or more images of the fiat money 103, the generated CBDC wallet address 112, and/or other information.

At block 515, the verification service 215 verifies that the fiat money 103 is valid. In some examples, the verification service 215 extracts the serial number 115 and determines whether the extracted serial number 115 is included in the list of serial numbers 115 of the currency registry 127 of the central bank 107 that issued the fiat money 103. For example, the verification service 215 can have access to the currency registry 127 by maintaining a copy of the currency registry 127 in the data store 227. In other examples, the verification service 215 can send a request to the central bank 107 including the extracted serial number 115. In response to the receiving the request, the central bank 107 can notify the verification service 215 if the serial number 115 is included in the currency registry and if so, the currency status 130.

In other examples, the verification service 215 can analyze additional features of the image of the fiat money 103 to determine whether the fiat money 103 is valid. For example, the verification service 215 can analyze the image to identify one or more markers embedded in the image that are indicators of valid physical currency. In some examples, the verification service 215 can generate a score based at least in part on the presence of one or more markers included in the image and the result of the serial number 115 comparison. The score can be used to determine whether the verification service 215 determines that the requested fiat money 103 is to be considered valid.

At block 518, the verification service 215 determines whether the currency type between the fiat money 103 and the CBDC associated with the CBDC wallet address 112 matches. For example, the CBDC wallet address 112 can be associated with a central bank 107 that issues a first type of currency (e.g., US dollar), and the fiat money 103 can be issued by a central bank 107 that issues a second type of currency (e.g., euro). If the types of currency match, the verification service 215 proceeds to block 521. Otherwise, the verification service 215 proceeds to block 530.

At block 521, the verification service 215 verifies destruction of the fiat money 103. In various examples, the fiat money 103 can be destroyed by being shredded, defaced (e.g., with a stamp), burned, or other form of destruction. In some examples, the scanning service 224 can provide an indication that the fiat money 103 is destroyed. For example, the scanning system 118 can comprise a destruction mechanism (e.g., stamp, defacer, shredder, incinerator, etc.) that receives the fiat money 103 after the image of the fiat money 103 is captured. The scanning service 224 can provide notice to the verification service 215 after the fiat money 103 has been destroyed. In some examples, the verification service 215 requests a second image of the fiat money 103 from the scanning service 224 where the obtained second image can be analyzed by the verification service 215 to determine that the fiat money 103 is destroyed. In some examples, the verification service 215 can verify destruction based at least in part on a user inputs provided by a trusted entity verifying the destruction of the fiat money 103. For example, the fiat money 103 can be presented to a bank, post office, or other type of trusted entity that can verify the destruction of the fiat money 103.

At block 524, the verification service 215 generates a transaction indicating the creation of the CBDC 106 based on the fiat money 103. For example, the verification service 215 generates the transaction to include the destination address in the CBDC ledger 109 (e.g., CBDC wallet address 112), the value of the CBDC 106 being added, a signature of a verifier entity associated with the verification service 215 performing the verification of the fiat money 103, a source address (e.g., verifier CBDC wallet address 133 (FIG. 2)), and/or other information. In various examples, the verification service 215 signs the transaction using a verifier private key 236. The signature of the transaction using the verifier private key 236 can indicate that the transaction has been verified and is permitted by the central bank 107.

At block 527, the verification service 215 publishes or otherwise writes the transaction to the CBDC ledger 109 in the CBDC network 206 using the CBDC wallet address 112 included in the request. In various examples, once a transaction or record is recorded in the CBDC ledger 109, it can be replicated across the peer-to-peer network until the record is eventually recorded with all of the nodes. Various consensus methods can be used to ensure that data is written reliably to the CBDC ledger 109 of the CBDC network 206. Thereafter, this portion of the process proceeds to completion.

At block 530, when the type of currencies fail to match at block 518, the verification service 215 determines the conversion amount between the money value 124 of the fiat money 103 and the value of the CBDC 106 to be added. In various examples, the verification service 215 can calculate the value of CBDC 106 to be added using the exchange rate between the two types of currencies. For example, assume that the fiat money 103 corresponds to a ten dollar United States bill (e.g., $10), the central bank 107 associated with the CBDC wallet address 112 issues euros, and the exchange rate is 1.04 dollars to 1 euro. In this example, the verification service 215 can calculate the value of the CBDC 106 to be 9.66 euros. In various examples, exchange rate can be included in the currency conversion rules 244 or accessed through interactions with other applications over the network 209.

At block 533, the verification service 215 generates a transaction indicating the creation of the CBDC 106 based on the fiat money 103 and the conversion amount. For example, the verification service 215 generates the transaction to include the destination address in the CBDC ledger 109 (e.g., CBDC wallet address 112), the value of the CBDC 106 being added, a signature of a verifier entity associated with the verification service 215 performing the verification of the fiat money 103, a source address (e.g., verifier CBDC wallet address 133 (FIG. 2), and/or other information. In various examples, the verification service 215 signs the transaction using a verifier private key 236. The signature of the transaction using the verifier private key 236 can indicate that the transaction has been verified and is permitted by the central bank 107.

At block 536, the verification service 215 publishes or otherwise writes the transaction to the CBDC ledger 109 in the CBDC network 206 using the CBDC wallet address 112 included in the request. In various examples, once a transaction or record is recorded in the CBDC ledger 109, it can be replicated across the peer-to-peer network until the record is eventually recorded with all of the nodes. Thereafter, this portion of the process proceeds to completion.

Figure 6:
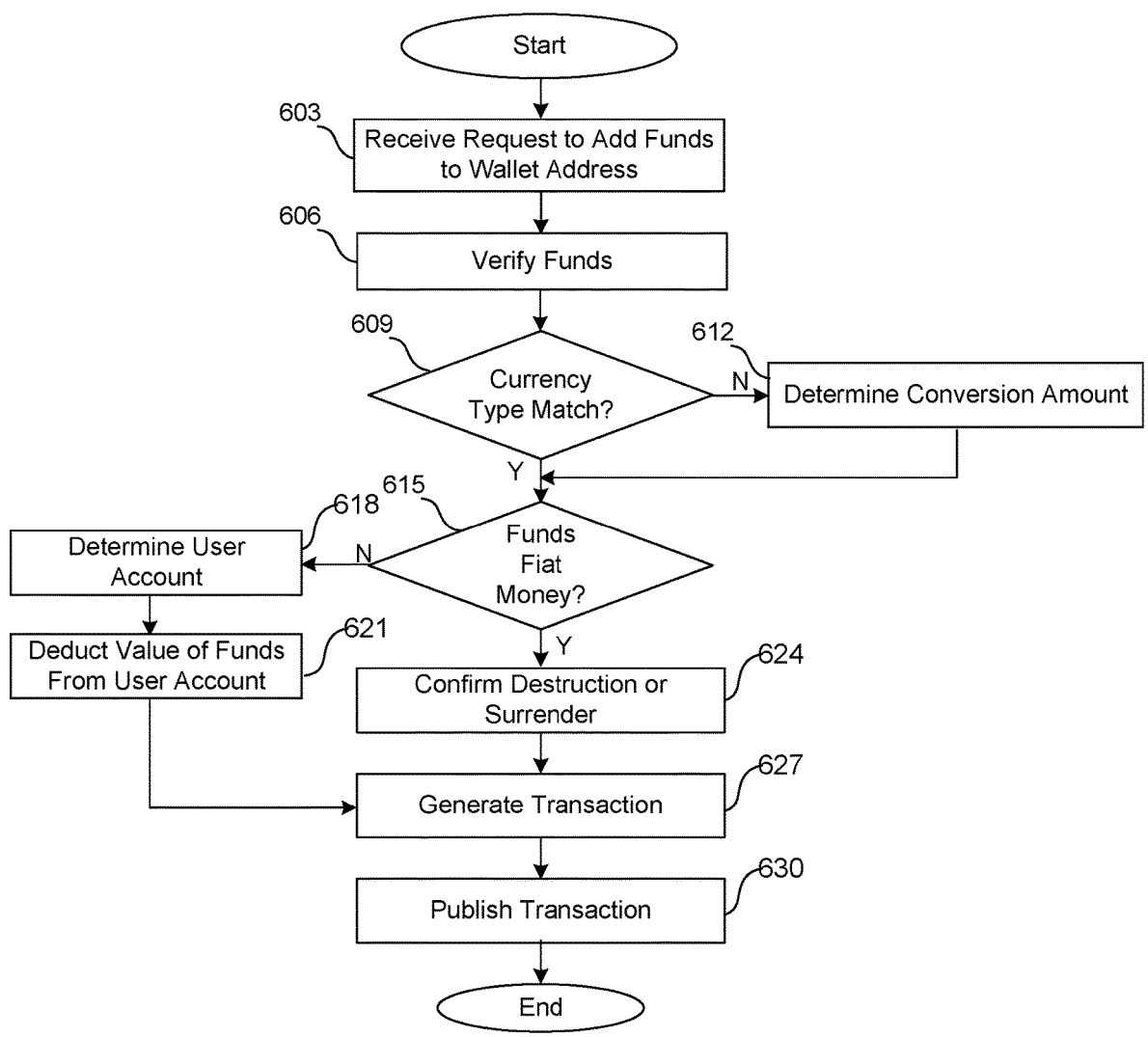
FIG. 6 is a flowchart illustrating one example of functionality implemented as portions of an application executed in a computing environment in the network environment of FIG. 2 according to various embodiments of the present disclosure.

Referring next to FIG. 6, shown is a flowchart that provides one example of the operation of a portion of the verification service 215. The flowchart of FIG. 6 provides merely an example of the many different types of functional arrangements that can be employed to implement the operation of the depicted portion of the verification service 215. As an alternative, the flowchart of FIG. 6 can be viewed as depicting an example of elements of a method implemented within the network environment 200. In particular, FIG. 6 relates to funding a CBDC wallet account associated with a CBDC wallet address 112. In various examples, the funds used to the fund the CBDC wallet account can correspond to fiat money 103, account currency, representative money, and/or any other type of funds that can be converted to CBDC.

Beginning with block 403, the verification service 215 receives a request to convert funds (e.g., fiat money 103, representative money, account currency, etc.) to CBDC 106. The request can be received by a scanning system 118, a client device 121, and/or other system or device in communication with the verification service 215. In various examples, the request to convert the fiat money 103 to CBDC 106 includes identification of the funds (e.g., image of fiat money 103, image of representative money, bank or credit account number, etc.), the CBDC wallet address 112, and/or other information.

At block 406, the verification service 215 verifies that the funds are valid. In various examples, the verification service 215 can extract the serial number 115 from an image of fiat money 103 and determine whether the extracted serial number 115 is included in the list of serial numbers 115 of the currency registry 127 of the central bank 107 that issued the fiat money 103. In other examples, the verification service 215 can send a request to the central bank 107 including the extracted serial number 115. In response to the receiving the request, the central bank 107 can notify the verification service 215 if the serial number 115 is included in the currency registry and if so, the currency status 130. For funds other than fiat money 103, the verification service 215 can identify an account number associated with he account currency or the representative money and communicate with the corresponding issuer to verify that the funds are valid. For example, if the funds are to be transferred from a bank account, the verification service 215 can verify that the amount of funds included in the request are available in the bank account.

At block 609, the verification service 215 determines whether the currency type between the funds and the CBDC associated with the CBDC wallet address 112 matches. For example, the CBDC wallet address 112 can be associated with a central bank 107 that issues a first type of currency (e.g., US dollar), and the funds can correspond to a second type of currency (e.g., euro). If the types of currency do not match, the verification service 215 proceeds to block 612. Otherwise, the verification service 215 proceeds to block 615.

At block 612, the verification service 215 determines the conversion amount between the money value 124 of the funds and the value of the CBDC 106 to be added. In various examples, the verification service 215 can calculate the value of CBDC 106 to be added using the exchange rate between the two types of currencies. For example, assume that the funds corresponds to a ten US dollars (e.g., $10), the central bank 107 associated with the CBDC wallet address 112 issues euros, and the exchange rate is 1.04 dollars to 1 euro. In this example, the verification service 215 can calculate the value of the CBDC 106 to be 9.66 euros. In various examples, exchange rate can be included in the currency conversion rules 244 or accessed through interactions with other applications over the network 209.

At block 615, the verification service 215 determines whether the funds include fiat money 103. In various examples, the funds can correspond to fiat money 103, representative money, account currency, and/or other type of funds. If the funds correspond to fiat money 103 (e.g., physical paper or coin currency), the verification service 215 proceeds to block 624. Otherwise, the verification service proceeds to block 618.

At block 618, the verification service 215 determines the user account associated with the funds. For example, if the funds are coming from a bank account, the request received in step 603 can include the bank account number associated with the funds request. If the funds correspond to representative money (e.g., a check), the verification service 215 can extract the routing number and account number from the image of the representative money received in the request.

At block 621, the verification service 215 deducts the value of the requested funds from the user account. For example, the verification service 215 can communicate with the issuer associated with the user account to request the deduction of funds from the user account.

At block 624, the verification service 215 verifies destruction or surrender of the fiat money 103. As discussed, fiat money 103 being of the same type of currency as the CBDC 106 will need to be destroyed and fiat money 103 being of a different type of currency of the CBDC 106 will need to be surrendered. In various examples, the fiat money 103 can be destroyed by being shredded, defaced (e.g., with a stamp), burned, or other form of destruction. In some examples, the scanning service 224 can provide an indication that the fiat money 103 is destroyed. For example, the scanning system 118 can comprise a destruction mechanism (e.g., stamp, defacer, shredder, incinerator, etc.) that receives the fiat money 103 after the image of the fiat money 103 is captured. The scanning service 224 can provide notice to the verification service 215 after the fiat money 103 has been destroyed or surrendered, where applicable. In some examples, the verification service 215 requests a second image of the fiat money 103 from the scanning service 224 where the obtained second image can be analyzed by the verification service 215 to determine that the fiat money 103 is destroyed. In some examples, the verification service 215 can verify destruction based at least in part on a user inputs provided by a trusted entity verifying the destruction of the fiat money 103. For example, the fiat money 103 can be presented to a bank, post office, or other type of trusted entity that can verify the destruction of or surrender of the fiat money 103.

At block 627, the verification service 215 generates a transaction indicating the creation of the CBDC 106 based on the fiat money 103. For example, the verification service 215 generates the transaction to include the destination address in the CBDC ledger 109 (e.g., CBDC wallet address 112), the value of the CBDC 106 being added, a signature of a verifier entity associated with the verification service 215 performing the verification of the fiat money 103, a source address (e.g., verifier CBDC wallet address 133 (FIG. 2), and/or other information. In various examples, the verification service 215 signs the transaction using a verifier private key 236. The signature of the transaction using the verifier private key 236 can indicate that the transaction has been verified and is permitted by the central bank 107.

At block 630, the verification service 215 publishes or otherwise writes the transaction to the CBDC ledger 109 in the CBDC network 206 using the CBDC wallet address 112 included in the request. In various examples, once a transaction or record is recorded in the CBDC ledger 109, it can be replicated across the peer-to-peer network until the record is eventually recorded with all of the nodes. Various consensus methods can be used to ensure that data is written reliably to the CBDC ledger 109 of the CBDC network 206. Thereafter, this portion of the process proceeds to completion.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:
1. A system, comprising:
   a computing device comprising a scanning device that is configured to receive fiat money, wherein the scanning device further includes a shredder system that is configured to dispose of the fiat money received by the scanning device, the computing device further comprising a processor and a memory; and machine-readable instructions stored in the memory that, when executed by the processor, cause the computing device to at least:
receive a request to convert the fiat money into central bank digital currency (CBDC) associated with a CBDC network, the request including an image of the fiat money that has been received into the scanning device and a CBDC wallet address;
verify that the fiat money is valid based at least in part on an analysis of the image and a status of a serial number of the fiat money in a central-bank registry;
cause the shredder system to shred the fiat money after verifying that the fiat money is valid;
generate a transaction record that specifies an addition of CBDC having an equivalent value of the fiat money to a CDBC wallet associated with the CBDC wallet address;
write the transaction record in a CBDC ledger associated with the CBDC network; and
update the central-bank registry to show that the serial number has been converted from a physical currency to a digital currency.

2. The system of claim 1, wherein the machine-readable instructions further cause the computing device to at least extract the serial number and a value of the fiat money from the image of the fiat money.

3. The system of claim 2, wherein the machine-readable instructions further cause the computing device to at least determine the status of the serial number in the central-bank registry associated with the central-bank.

4. The system of claim 1, wherein the machine-readable instructions further cause the computing device to at least determine that the fiat money is destroyed before generating the transaction record.

5. The system of claim 4, wherein the fiat money is determined to be destroyed when the fiat money is at least one of shredded, burned, or defaced.

6. The system of claim 1, wherein the machine-readable instructions further cause the computing device to at least sign the transaction record with a private key corresponding to a verifier CBDC wallet address.

7. The system of claim 1, wherein the computing device is integrated with the scanning device.

8. A method, comprising:
receive fiat money that is inputted into a scanning system, wherein the scanning system further includes a shredder system;
generate, by the scanning system, an image of the fiat money;
receiving, by a computing device, a request to fund a central bank digital currency (CBDC) wallet with the fiat money, the CBDC wallet being associated with a CBDC wallet address, the request comprising a CBDC wallet address and the image of the fiat money;
verifying, by the computing device, that the fiat money is valid based at least in part on an analysis of the image of the fiat money and a status of a serial number of the fiat money in a central-bank registry;
determining, by the computing device, a value of the fiat money;
causing, by the computing device, the shredder system to shred the fiat money after verifying that the fiat money is valid;
generating, by the computing device, a transaction record corresponding to an addition of CBDC having a CBDC value corresponding to the value of the fiat money to a CDBC wallet associated with the CBDC wallet address;
writing, by the computing device, the transaction record in a CBDC ledger; and
update, by the computing device, the central-bank registry to show that the serial number has been converted from a physical currency to a digital currency.

9. The method of claim 8, further comprising determining that a first currency type associated with the CBDC wallet address differs from a second currency type associated with the fiat money.

10. The method of claim 9, further comprising determining the CBDC value by converting the value of the fiat money using an exchange rate between the first currency type and the second currency type.

11. The method of claim 8, further comprising determining that the CBDC wallet address is associated with a currency type of the fiat money.

12. The method of claim 8, wherein the request is received from a client device associated with a user.

13. The method of claim 8, wherein the request is received from the scanning system that collects and scans fiat money inserted into an opening of the scanning system.

14. The method of claim 8, wherein the computing device is integrated with the scanning system.

15. A non-transitory, computer-readable medium, comprising machine-readable instructions that, when executed by a processor of a computing device, cause the computing device to at least:
cause a scanning system to capture an image of fiat money, wherein the scanning system further includes a shredder system;
extract a serial number and a value from the image of the fiat money;
verify that the fiat money is valid based at least in part on the image of the fiat money and a status of the serial number logged in a central-bank registry;
cause the shredder system to destroy the fiat money by shredding the fiat money after verifying that the fiat money is valid;
generate a transaction record for a central bank digital currency (CBDC) ledger, the transaction record specifying an addition of CBDC having a value corresponding to the fiat money;
publishing the transaction record to the CBDC ledger; and
updating the central-bank registry to show that the serial number has been converted from a physical currency to a digital currency.

16. The non-transitory, computer-readable medium of claim 15, wherein the machine-readable instructions, when executed by the processor, further cause the computing device to at least:
before the shredder system destroys the fiat money, determine that the fiat money is not destroyed;
specify a hold on a use of the CBDC as currency.

17. The non-transitory, computer-readable medium of claim 16, wherein the machine-readable instructions, when executed by the processor, further cause the computing device to at least update the transaction record to remove the hold in response to determining that the fiat money is destroyed.

18. The non-transitory, computer-readable medium of claim 15, wherein the machine-readable instructions, when executed by the processor, further cause the computing device to at least obtain a request to convert the fiat money to the CBDC, the request include the image of the fiat money and a CBDC wallet address.

19. The non-transitory, computer-readable medium of claim 15, wherein the CBDC ledger comprises a distributed ledger.

20. The non-transitory, computer-readable medium of claim 15, wherein the computing device is integrated with the scanning system.

* * * * *